United States Patent [19]
Wayne

[11] Patent Number: 5,628,442
[45] Date of Patent: May 13, 1997

[54] PACKAGE-RETAINING ACCESSORY FOR VEHICLE CARGO AREA

[76] Inventor: Mark Wayne, 29436 Briarbank Ct., Southfield, Mich. 48034

[21] Appl. No.: 290,005

[22] Filed: Aug. 12, 1994

Related U.S. Application Data

[63] Continuation of Ser. No. 845,696, Mar. 4, 1992, abandoned.

[51] Int. Cl.$^6$ .................................................. B60R 7/00
[52] U.S. Cl. ..................... 224/543; 224/539; 224/42.34; 224/42.33; 383/62
[58] Field of Search ................. 224/42.46 R, 273, 224/279, 318, 42.42; 220/403, 404, 523, 532, 533, 9.1, 9.2, 9.3, 290–292, 335, 334; 296/37.6, 39.1, 39.2; 383/38, 78, 81, 33, 62, 117, 86, 22; 190/19; 206/561

[56] References Cited

U.S. PATENT DOCUMENTS

| | | | |
|---|---|---|---|
| 783,811 | 2/1905 | Allen | 383/99 |
| 1,204,416 | 11/1916 | Doser | 224/42.46 R |
| 3,717,188 | 2/1973 | Green | 383/86 |
| 4,303,367 | 12/1981 | Bott | 220/403 X |
| 4,339,061 | 7/1982 | Dunn | 224/42.46 R X |
| 4,718,583 | 1/1988 | Mullican | 224/42.42 |
| 4,728,017 | 3/1988 | Mullican | 224/42.42 |
| 4,778,213 | 10/1988 | Palmer | 296/37.16 X |
| 4,941,602 | 7/1990 | Wells | 224/273 X |
| 4,974,760 | 12/1990 | Miller | 224/42.46 R |
| 5,007,671 | 4/1991 | Oprea | 296/39.2 |
| 5,012,963 | 5/1991 | Rosenbaum | 224/42.46 R |
| 5,058,786 | 10/1991 | Politi | 224/318 X |
| 5,096,107 | 3/1992 | Van Son | 224/318 X |
| 5,167,439 | 12/1992 | Bott | 220/533 |

FOREIGN PATENT DOCUMENTS

| | | | |
|---|---|---|---|
| 548313 | 6/1956 | Belgium | 224/273 |
| 975452 | 3/1951 | France | 224/273 |
| 2591164 | 6/1987 | France | 224/273 |
| 9117066 | 11/1991 | WIPO | 296/39.2 |

Primary Examiner—David J. Walczak
Attorney, Agent, or Firm—Gifford, Krass, Groh, Sprinkle, Patmore, Anderson & Citkowski, P.C.

[57] ABSTRACT

A package-retaining accessory for the cargo area of vehicle includes a package-retaining closure that is attachable to a wall or a divider of the cargo area. The accessory is comprised of a collapsible fabric material or a rigid material. The top portion in the fabric embodiment is supported in an upright position either by a pair of extension lines or by a plurality of brackets. The brackets may be fixedly attached to the wall or may be pivotably attached so that the bracket may be moved from an extended, closure supporting position to a folded position where the closure is relaxed. A retractable, foldable top is provided with fasteners to tie it in either an open position or a closed position.

21 Claims, 6 Drawing Sheets

PACKAGE-RETAINING ACCESSORY FOR VEHICLE CARGO AREA

This is a continuation application Ser. No. 07/845,696 filed on Mar. 4, 1992 now abandoned.

BACKGROUND OF THE INVENTION

I. Field of the Invention

The present invention relates generally to vehicle cargo area accessories for retaining materials and packages. More particularly, the present invention relates to a package-retaining accessory for a vehicle cargo area comprising a closure having a retractable top. A liner for the closure may also be provided.

II. Description of the Relevant Art

Cargo spaces and cargo areas provided in motor vehicles typically used for hauling are generally large expanses of space that are intended for large loads. While users of the vehicles in this category (vans and pick-up trucks) sometimes require the entire amount of available cargo space when they carry loads of lumber, loose materials, gravel and the like, not all users require such large space, and even those users who generally require such space do not need such space at all times. There are many circumstances under which smaller segments or smaller spaces would be desired.

For example, the owner of a pick-up truck may occasionally wish to use this truck for grocery shopping. When employed for such use, the operator of the vehicle has the option of placing the bags of groceries in the cab on the passenger side of the vehicle. This is not always practical, however, in that very often a passenger may accompany the vehicle operator to the store. Even if there was only the operator making the trip, oftentimes it is not desirable to have loose groceries disposed next to the operator, as upon the turning of a sharp corner, some of these groceries may free themselves from their holding bag.

Accordingly, in any event, it may be desired to place the grocery bag within the confine of the cargo area of the motor vehicle, whether this cargo area is a bed of a pick-up or the interior space of a van.

While there are available on the market interior dividing walls that may be disposed within the cargo area of the vehicle, none of these known cargo area dividing systems includes a space defining barrier such that smaller packages may be restrained from shifting about.

Accordingly, the prior art has failed to provide a system that can efficiently and properly restrain small packages in the cargo areas of vehicles.

SUMMARY OF THE PRESENT INVENTION

The present invention provides a package-retaining accessory for the cargo area of a pick-up truck or a van. The accessory may be fitted to either a wall of the cargo area or may be fitted to divider provided within the cargo area. In a preferred embodiment, the accessory may be attached to a divider wall provided today as an option for insertion within the cargo area of a motor vehicle. The divider may be either a "single story" type or may be a "two story" type where one divider is provided on top of another.

The package-retaining accessory according to the present invention includes a closure preferably composed of a flexible material, such as a netting. The closure preferably has depth and height sufficient to maintain a conventional shopping bag or similar package. The accessory according to the present invention is preferably wide enough to fit along a vehicle bed divider or the wall of a cargo area.

To provide both support and to subdivide the accessory into smaller regions, in one embodiment a plurality of L-shaped brackets are provided to support the top of the accessory Preferably, the accessory top includes a substantially U-shaped bar which attaches to the cargo area wall or divider at its free ends. The L-shaped brackets provide support so that the top of the accessory can remain suspended.

In an alternate embodiment, the brackets may be pivotably attached to the wall or divider, whereby the bracket may be pivoted from one of an outright, supporting position whereby the accessory is held up to another of a folded position where the accessory is allowed to substantially collapse against the wall or the divider.

In a further alternate embodiment, a plurality of extension lines that connect the top of the flexible closure with the sides of the cargo area are provided. The closure top is then stretched so that it is maintained in an open position. The extension lines may be attached to the sides of the cargo area by brackets or conventional fasteners.

In its flexible embodiment the accessory includes a pair of side walls, a back wall, a front wall and a base. In addition, a retractable top is also provided that may be rolled from one of a covering position to one of a retracting position. In either position, fasteners are provided to maintain the position of the top. These fasteners may be either conventional tie-downs, buttons, or hook-and-loop fasteners.

A rigid embodiment of the package retaining accessory is also disclosed. This form also includes a pair of side walls, a back wall, a front wall and a base. A hinged cover is used. As an option, a liner is provided in the accessory. The liner prevents liquids from escaping the closure, while at the same time providing some insulation. The rigid body may alternatively be composed of a firm material such as a plastic or a metal.

In either embodiment, the present invention provides a convenient and efficient system for retaining the small packages of a vehicle operator. The construction is light-weight in that it is made of a flexible material or a light-weight plastic or metal, is easily collapsed in its soft-sided formed is easily extended for use. Furthermore, the accessory according to the present invention makes a very desirable feature for cargo areas.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiments of the present invention when read in conjunction with the accompanying drawing, in which like reference characters refer to like parts throughout the views and in which.

DETAILED DESCRIPTION OF THE PREFERRED EMBODIMENTS OF THE PRESENT INVENTION

The drawings disclose the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

Figures 1, 2, 3:
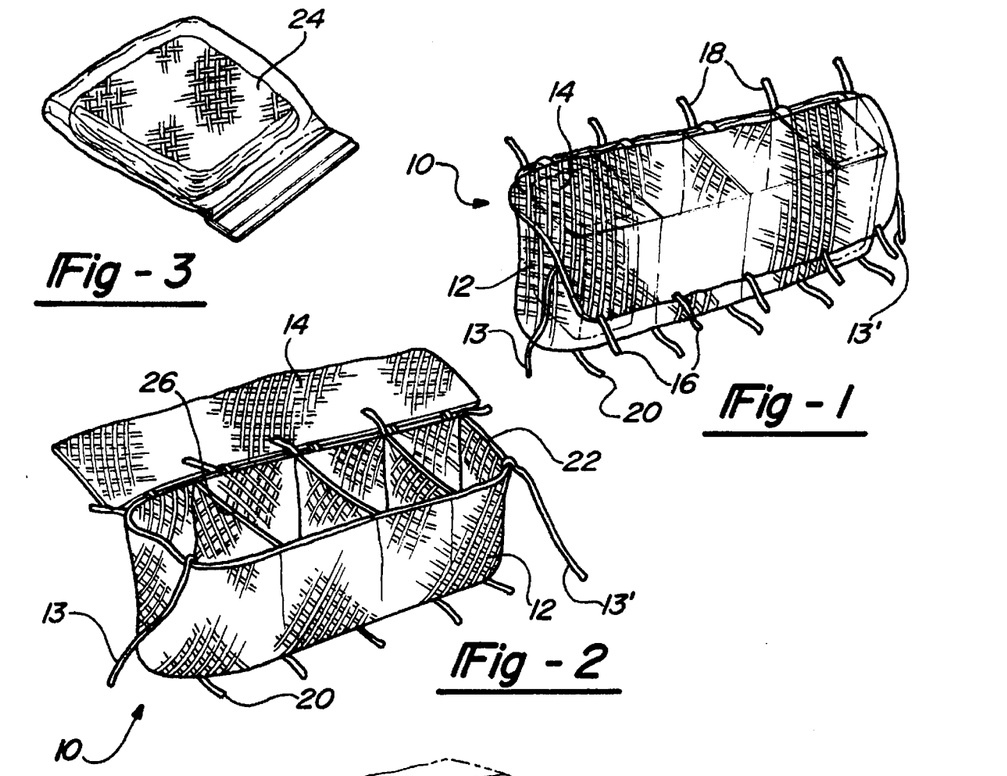
FIG. 1 is a perspective view of the package-retaining accessory according to the present invention.
FIG. 2 is a perspective view similar to that view shown in FIG. 1 except showing the top in its open position.
FIG. 3 is a perspective view of the accessory according to the present invention contained within a storage bag.

Referring to FIG. 1, a view of the preferred package-retaining accessory of the present invention, generally illustrated as 10, is shown. The accessory 10 includes a retaining body 12 and a retractable cover 14.

The accessory 10 may be composed of one of many fabrics or flexible materials, and may be a closed or a loose weave fabric. However, the material of the accessory 10 is preferably a net as illustrated to allow the by-passage of air or water and to minimize weight while maximizing flexibility. Whatever weave is chosen, the material may be composed of either natural or man-made material.

Although the accessory 10 is preferably composed of a fabric, the accessory 10 may well be composed of a firm material such as a plastic or a metal. This embodiment is discussed below with respect to FIGS. 15 and 16.

FIG. 1 also illustrates the preferred method of securing the retractable cover 14 to the retaining body 12. According to this construction, a plurality of cover fasteners 16 are provided for attachment to either an upper plurality of ties 18 when the cover is in its retracted position or to a lower plurality of ties 20 when the cover is in its extended or closed position. The fasteners 16, 18, 20 may be simple tie strings, hook and loop fasteners, or straps fitted with snap fasteners. Whichever type of fastener is selected, the object of the fasteners 16, 18, 20 is to securely retain the cover 14 in one of either the retracted position or the covering position. (The latter is particularly important when the accessory 10 is used in conjunction with the bed of a pick-up truck where it is exposed to strong drafts.)

A pair of extension lines 13, 13' are provided to attach the body 12 to the sides of the cargo area. This construction assures that the body 12 will keep its shape by extending the top into a fixed "open" position. This feature may be more clearly understood by reference to FIG. 6, infra.

With reference to FIG. 2, the accessory 10 is illustrated in a way very similar to the view of FIG. 1, except that the cover is removed to one side so that the interior of the accessory 10 may be viewed. As noted, the body 12 is held open by a pair of taut extension lines 13, 13'. As an alternative, the body may be held open by a rigid bar 22 provided at the upper end (the open end) of the body 12. The bar 22 gives the body 12 support and shape. Preferably, the bar 22 may be slipped in and out of a loop (not shown in detail) fitted to the top end of the body 12. This construction allows the accessory 10 to be folded when not in use. FIG. 3 shows a storage bag 24 for containing the folded accessory 10 after being folded.

FIG. 2 also illustrates a plurality of dividers 26 that both provide support for the bar 22 and define sections within the accessory 10. (Alternatively, the sections could be subdivided by fabric walls or cord.)

Figure 4:
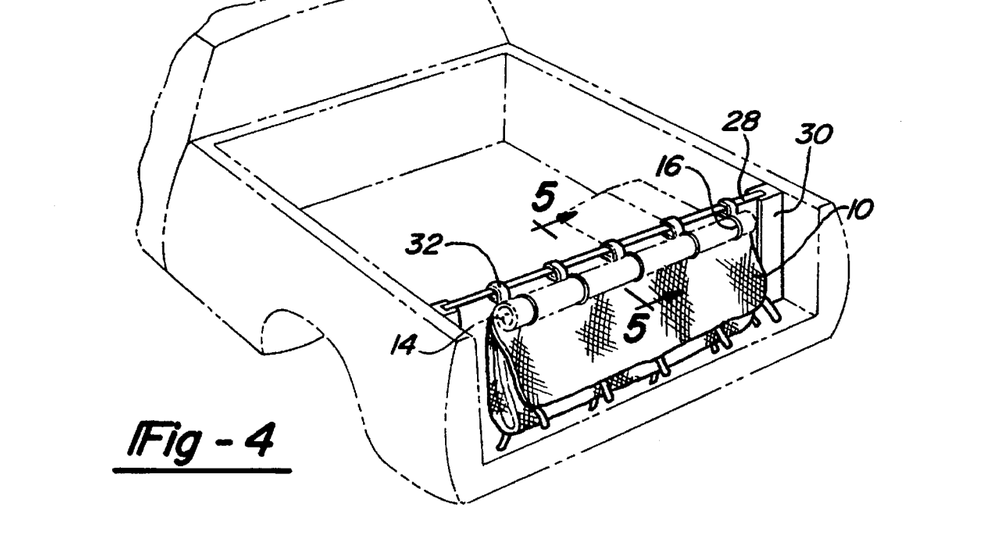
FIG. 4 is a perspective view of the accessory in a suggested environment.

FIG. 4 illustrates a perspective view of the accessory 10 in place on a vehicle bed partitioning divider 28. The divider 28 is removably provided within the cargo area of a vehicle. Although a pick-up truck style vehicle is illustrated, it should be understood that the divider 28 and its associated accessory 10 may be provided in a van or similar utility vehicle. The divider 28 may be attached to the cargo area by an insert 30.

As illustrated, the retractable cover 14 is shown in its retracted and rolled position as indicated in broken lines. The fasteners 16 are tied to the fasteners 18 to hold the cover 14 in its rolled position. The rolled position illustrated in FIG. 4 provides a secured method for keeping the cover 14 out of the way during storage or when the vehicle is in motion.

While the divider 28 is shown disposed to the rear of the cargo area, the divider could be placed closer to the front of the cargo area or may be placed axially with respect to the axis of the cargo area.

Figures 5, 6:
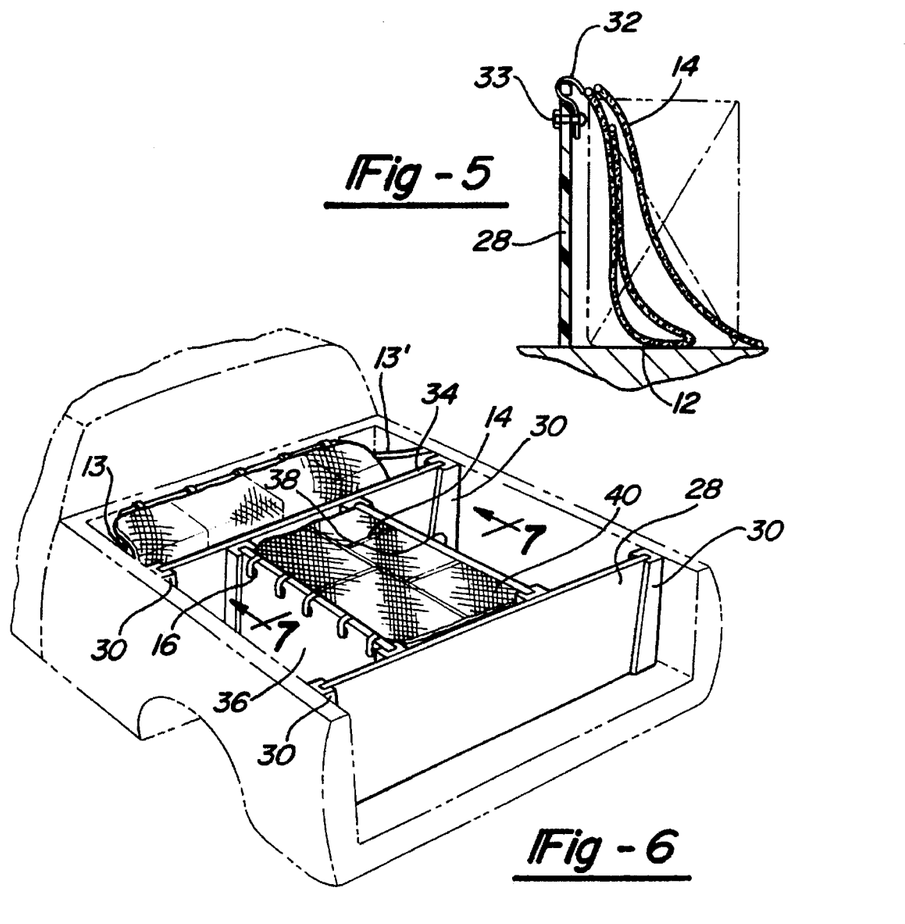
FIG. 5 is a view taken along line 5—5 of FIG. 4.
FIG. 6 is a perspective view of accessories of the present invention shown in an alternate suggested environment.

FIG. 5 is a sectional view taken along line 5—5 of FIG. 4. According to this view, the body 12 is shown in a relaxed position and the cover 14 is illustrated as being extended and untied. A strap 32 is provided to attach the accessory 10 to the divider 28. A conventional fastener 33 connects the strap 32 to the divider.

FIG. 6 shows a modified assembly of the accessory 10 as used in a cargo area having a number of dividers disposed therein. In addition to the rear divider 28, a forward divider 34 and a pair of axial dividers 36, 38 are included. The extension lines 13, 13' are clearly visible and their relationship to the body 12 and the cargo area may be better understood by reference to this view.

Figure 7:
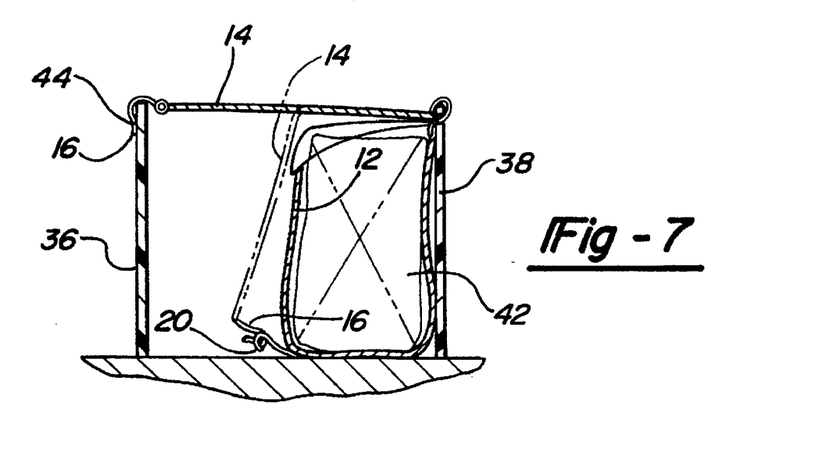
FIG. 7 is a view taken along line 7—7 of FIG. 6.

In addition to the accessory 10 attached to the front wall of the cargo area, an axial accessory 40 is included and is disposed between the axial dividers 36, 38. The axial accessory 40 is substantially identical to that of the accessory 10, except that the cover 14 extends across the open space defined between the two dividers 36, 38. This construction may be understood more clearly by reference to FIG. 7 which is a view of the modified version shown in FIG. 6. FIG. 7 is a view taken along line 7—7 of FIG. 6.

According to the view of FIG. 7, the cover 14 is shown in its extended position. The cover 14 extends between dividers 36 and 38 as illustrated. A package 42 is shown in place within the body 12. The package 42 may be a grocery bag, a parcel or some other container to be restrained within the accessory of the present invention. The extended cover 14 may be tied down to divider 36 by use of the fasteners 16. The fasteners 16 are preferably locked to the divider 36 by hook and loop fasteners 44.

The extended cover 14 as illustrated in FIG. 7 is an option of how the cover may be situated. Alternatively, and as also shown in FIG. 7, the cover 14 may be secured along the front of the body 12 as shown in broken lines.

Figure 8:
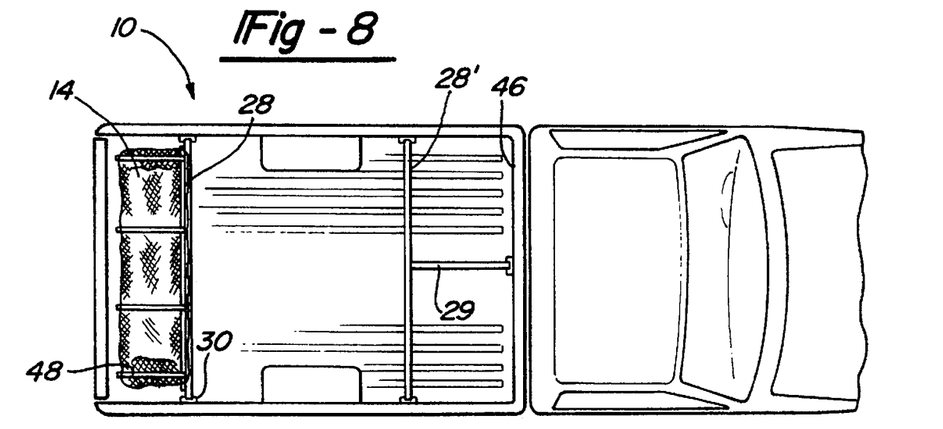
FIG. 8 is a top plan view of a pick-up truck showing the accessory in place.

Referring to FIG. 8, top plan view of the accessory 10 is shown in place within the cargo area of a vehicle. Again, while the accessory 10 and its associated divider 28 are shown as being disposed at the approximate end of the cargo area, it is equally possible and practical to situate the accessory 10 near the front end of the cargo area. Additionally, or alternatively, the accessory 10 and the divider 28 may be axially disposed as shown in FIG. 6. It should also be noted that while the divider 28 is preferably used, the accessory 10 may be attached directly to a front wall 46.

Figure 17:
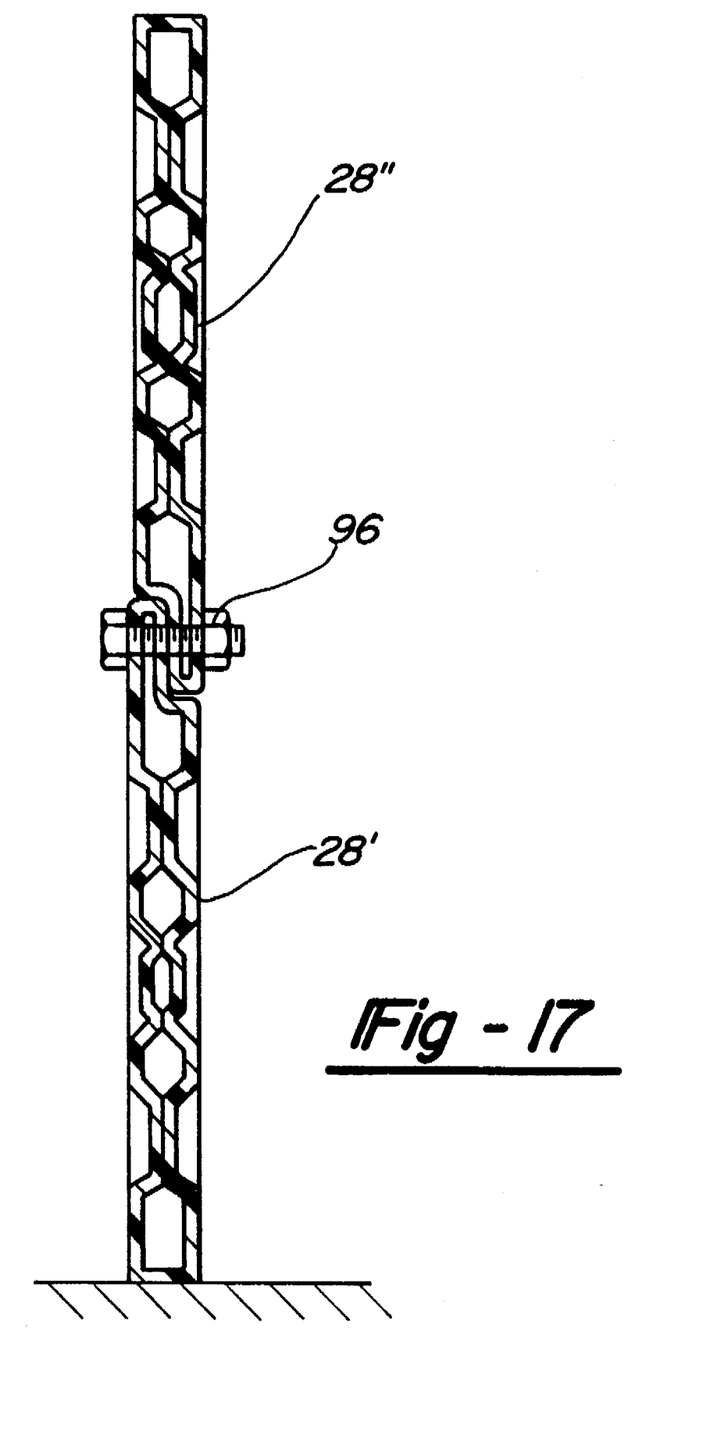
FIG. 17 is a cross-sectional view of a preferred embodiment representing a pair of divider walls set one atop the other.

FIG. 8 also discloses a method of employing the divider walls so that the cargo-carrying capacity of the vehicle is improved. A wall 28' illustrates this feature. The wall 28' is intersected by a wall 29 that extends between the wall 28' and the wall 46 to further sub-divide the cargo area. This sub-divison of the cargo area may be extended one more step by doubling up the walls as illustrated in FIG. 17, discussed below. In this situation, two walls are placed one atop the other, thereby prohibiting liquids, grains or other aggregate material from passing from one section to another. The taller the wall, the less likely overspill.

There are two preferred constructions for supporting the body 12 of the accessory 10. The first is to provide a supporting bracket, and this construction is disclosed in FIGS. 9 through 12. The second construction includes a supporting line interconnecting the body 12 and one or more of the walls of the cargo area of the vehicle. This construction is demonstrated below in FIGS. 13 and 14.

Figures 9, 10, 11, 12:
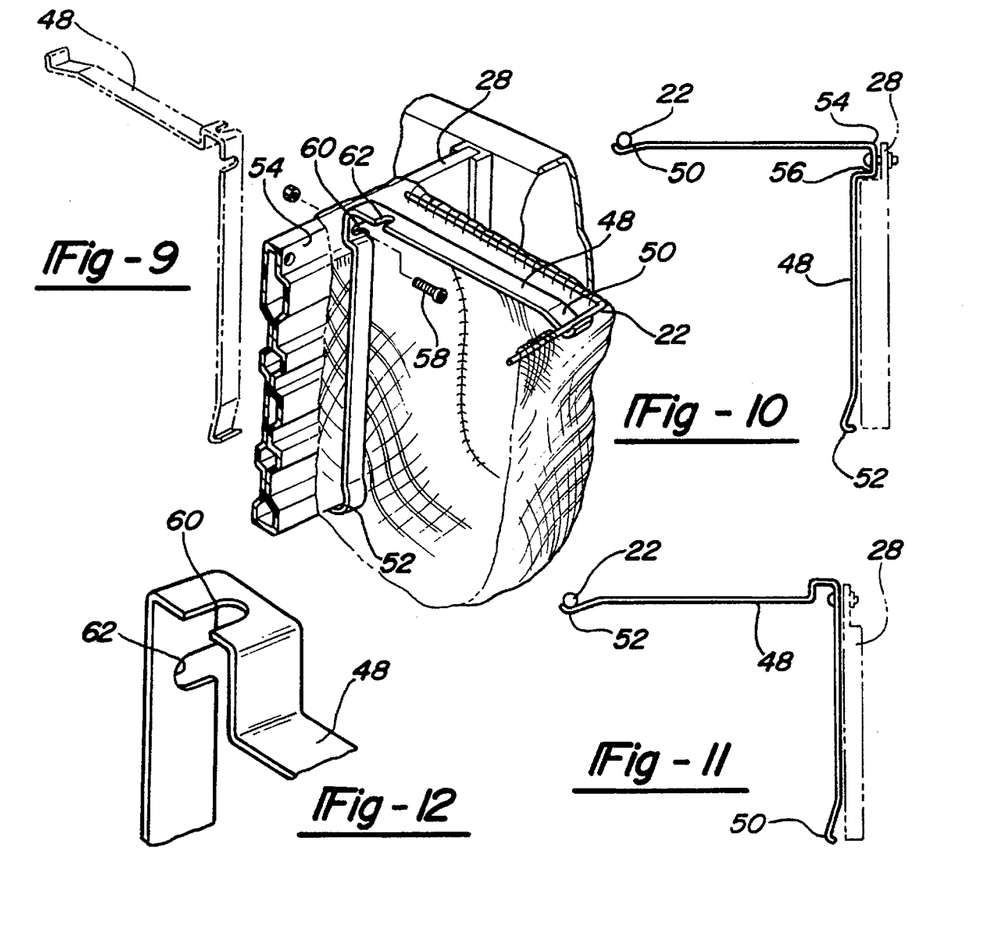
FIG. 9 is a detailed view of the accessory-supporting bracket fitted to a truck bed divider.
FIG. 10 is a side view of the accessory-holding bracket of the present invention in place on a vehicle wall.
FIG. 11 is a view similar to that of FIG. 10 except showing the bracket in a reversed position.
FIG. 12 is a view detailing the fastener-receiving apertures defined in the corner of the bracket.

With respect to FIG. 9, a perspective view of the accessory 10 is shown illustrating in detail the incorporation of a supporting bracket 48. The bracket 48 is preferably composed of a resilient material such as a metal or a plastic.

The bracket 48 is shaped so as to be securely fitted to the contours of the divider 28. The bracket 48 includes a pair of ends 50, 52. Each of these ends 50, 52 may be used to support the rigid bar 22 fitted to the upper edge of the body 12.

The two ends 50, 52 are provided so that the bracket 48 may be reversibly mounted according to the contour of the divider 28. The reversibility of this design may be more fully understood by reference to FIGS. 10 and 11.

With respect to FIG. 10, the bracket 48 is shown attached to a first side of the divider 28 which includes a groove upper area 54. To fit the contour of the grooved upper area, a protruding portion 56 of the bracket 48 is provided.

FIG. 11 illustrates the bracket 48 in its reversed position and fitted flush to a flat side of the divider 28. As may be understood by reference to both FIGS. 10 and 11, the bracket 48 provides support for the bar 22 either way it is attached to the divider 28.

It should be understood that the construction of the bracket 48 is not limited to the shape shown in FIGS. 9–12, but may be of such shape as to fit cooperatively with the contours of the surfaces of other dividers (not shown). The significance of the present design of the bracket 48 is that it is reversible, and this is characterized by the alternate fittings of FIGS. 10 and 11, and is further characterized by the bracket 48 shown in broken lines in FIG. 9.

With respect to FIG. 9, the method of attaching the bracket 48 is shown as being accomplished by a conventional fastener 58. To facilitate easy attachment, a pair of slotted apertures 60, 62 are defined at the approximate corner of the bracket 48. This construction may be more easily understood with reference to FIG. 12 which details the apertures 60, 62 and their relationship to the approximate corner of the bracket 48.

Although FIGS. 9 through 12 illustrate the bracket 48 as being a fixed, single-pieced unit, an alternative bracket (not shown) may be employed that includes an upper extension arm to hold the bar 22, but which pivotably attaches to the divider 28 so that the arm may be swung away, thus allowing the body 12 to collapse to its folded position as illustrated in FIG. 5.

Figures 13, 14, 15, 16:
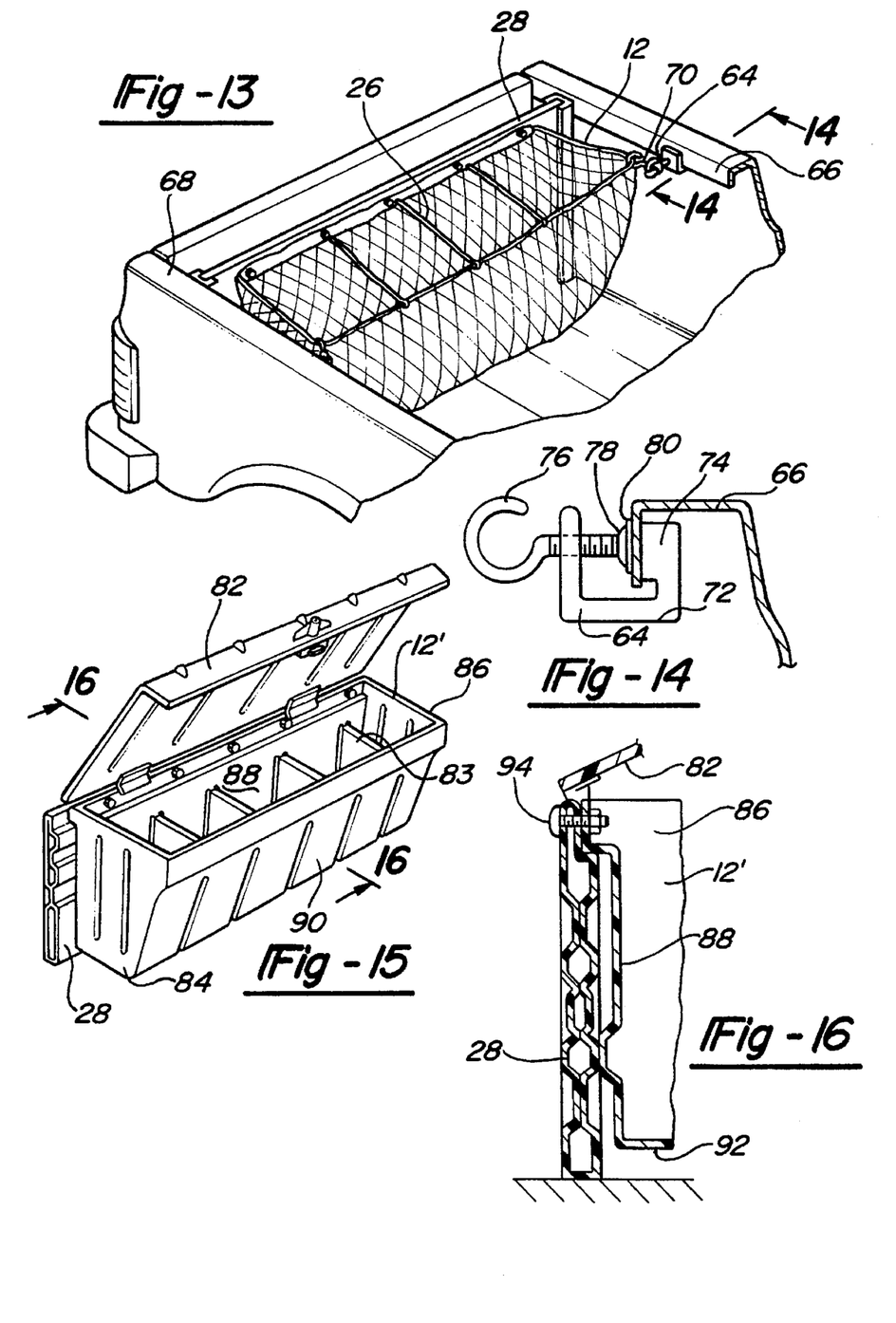
FIG. 13 is a perspective view of the accessory within the bed of a pickup truck and being suspended in its open position by a hook and line combination.
FIG. 14 is a cross-sectional view detailing the hook fitted to the inner wall of the cargo area of a vehicle taken along line 14—14 of FIG. 13.
FIG. 15 is a perspective view illustrating a rigid-sided accessory embodiment of the present invention.
FIG. 16 is a cross-sectional view taken along line 16—16 of FIG. 15 to detail the attachment of the rigid-sided accessory to the divider.

With respect to FIGS. 13 and 14, an alternate method of supporting the body 12 is illustrated. The body 12 is substantially the same as discussed above, but according to this method of support, does not necessitate the presence of either the bar 22 or the bracket 48.

According to this construction, a hook assembly 64 is fitted to both of the pair of side walls 66, 68 of the bed of the cargo area of the vehicle. The hook assembly 64 is positioned relative to the body 12 so that the body 12 is maintained in its open position. This construction requires that the hook assembly 64 be situated on the walls 66, 68 just far enough away from the body 12 so as to suspend the body 12. An interconnecting line 70 is disposed between the hook assembly 64 and the body 12. Preferably the line 70 is composed of an elastomeric material to thereby achieve maximum tension on the body 12 while allowing for slight variation of the position of the hook assembly 64 relative to the body 12. In any event, the goal of this embodiment is to attach the line 70 to a wall of the cargo area so that the top of the body 12 is extended without the need for rigid supports such as brackets.

As illustrated in FIG. 2, a plurality of dividers 26 interconnect the front and back walls of the body 12. The dividers 26 may comprise either partial walls or may be complete top-to-bottom walls. Alternatively, they may simply be single dividing lines.

FIG. 14, taken along line 14—14 of FIG. 13, illustrates in greater detail the construction of the hook assembly 64. This view discloses the hook assembly body 72 attached to the wall 66. The hook assembly body 72 includes a foot member 74, a hook 76, and movable shoe 78. A pad 80 is optionally provided disposed between the movable shoe 78 and the wall 66 to prevent the marring or scratching of the painted surface of the wall 66.

While FIGS. 13 and 14 illustrate the hook assembly 64 as the particular method of securing the line 70, it should be understood that other methods of suspending the body 12 in its open position by a line may be used. For example, rather than hook assembly, an aperture my be stamped directly into the wall 66. Alternatively, a loop may be formed in the polymerized material that composes a bed liner.

Furthermore, although the hook assembly 64 is shown as being attached to the wall 66, it may be attached alternatively to an additional divider (not shown) that is disposed in a spaced apart manner with respect to the divider 28 to which the body 12 is preferably attached.

With respect to FIGS. 15 and 16, an alternative form of the body 12 is illustrated, and is designated as a body 12'. According to this construction, the body 12' is of a rigid-sided construction and includes a top 82, a pair of sides 84, 86, a back wall 88, a front wall 90, and a base 92 (see FIG. 16). A plurality of transverse inner dividers 83 are removably provided within the body 12'. The dividers 83 are preferably composed of a rigid material. According to this embodiment, the body 12' is composed either of a polymerized material such as a plastic or a nylon or a metal such as aluminum.

Although the materials out of which the body 12' is composed differ from the materials of the body 12 discussed above with respect to FIGS. 1 through 12, as may be seen, the method of attachment to the divider 28 is the same. This may be understood more clearly by reference to FIG. 16 which illustrates a cross-sectional view of the body 12' attached to the divider 28. The body 12' is attached to the divider 28 by means of a fastener 94. Other than the fact that the body 12' does not require that there be a method of supporting it as there is with the soft form of the body 12 discussed initially, the body 12' is disposed within the cargo area in the same manner as the body 12.

With respect to the discussion relating to FIG. 8 above, it was observed that the walls could be "doubled up" to increase height and thereby prevent overspill of liquids or aggregates carried in a section of the cargo area. FIG. 17 illustrates the method of creating a "two story" wall from the walls provided. As discussed with respect to FIG. 9, the wall 28 preferably includes the grooved upper area 54. This same grooved upper area is provided in both the wall 28' and an upper wall 28" shown in FIG. 17. The walls are identical, only the top one is turned upside-down so as to allow the two grooved areas 54 to mate. A conventional fastener 96 holds the two walls 28', 28" together. If this "two story" assembly is used in, for example, the layout shown in FIG. 8, the sections formed by the walls will securely hold their contents, even if loose or liquid.

Figure 18:
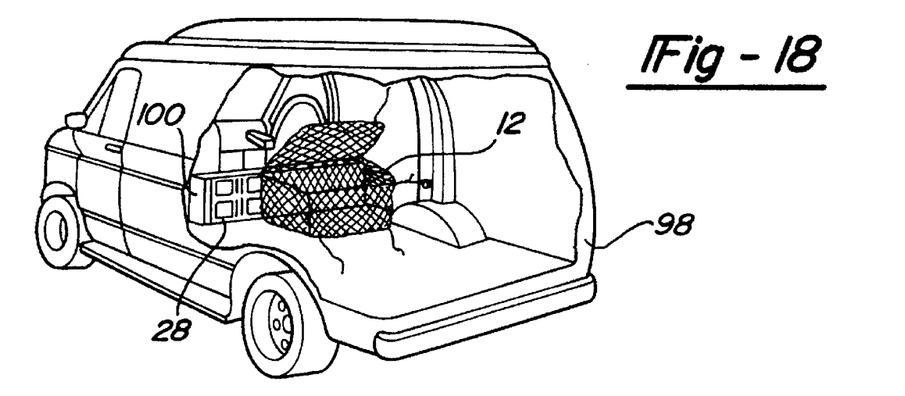
FIG. 18 is a cut-away view of a cargo van showing a use of the package-retaining accessory of the present invention therein.

FIG. 18 illustrates a cut-away view of a van 98 having the wall 28 provided behind the driver's and passenger's seats. Wall- or floor-mounted brackets 100 are provided for support. The body 12 is attached to the wall 28 as discussed above. As shown, the body 12 is positioned on the rearward-facing side of the wall 28. The preferred placement, however, may be on the frontward-facing side of the wall 28 to provide the driver and passenger access to the body 12 for storage of items that need to be available to them without their having to leave their seats. Additionally, with the body 12 removed from the rearward-facing side of the wall 28, a package (not shown) could be placed within the cargo area and secured to the wall 28 by straps or cords.

Figure 19:
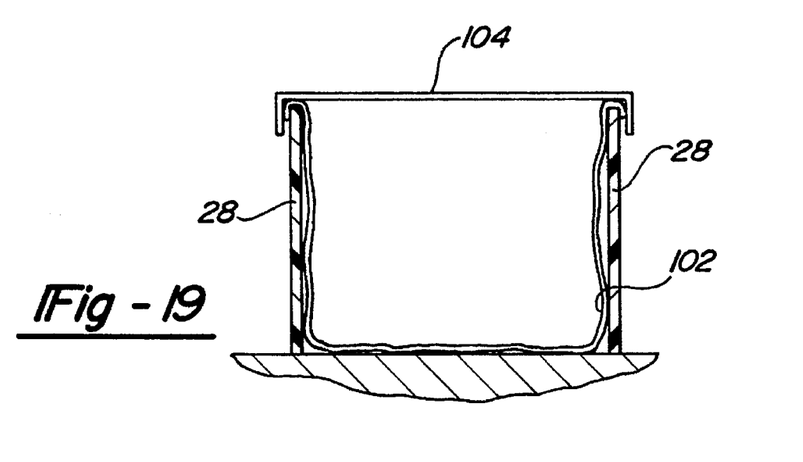
FIG. 19 is a cross-sectional view of a rigid-sided accessory having a liner.

FIG. 19 illustrates a package-retaining construction according to the present invention that may either be the pair of walls 28 or the rigid body 12' as shown and discussed above with respect to FIGS. 15 and 16. Whatever the embodiment, the package-retainer is provided as shown with a liner 102. The liner 102 keeps liquid and moisture in the retainer, and also serves the added function of insulator. A snug fitting top 104 provides a proper seal. The liner 102 may rest on the floor of the cargo area or, in the case of the body 12', on the base of the body. Alternatively, the liner 102 may be provided so that it is maintained off of the floor either by a method of suspension or a riser. The liner 102 is preferably composed of a plastic to assure that liquid will not pass.

Having described my invention, however, many modifications thereto will become apparent to those skilled in the art to which it pertains without deviation from the spirit of the invention as defined by the scope of the appended claims.

I claim:

1. In combination with a pick up truck having a truck bed, a package-retaining accessory, said accessory comprising:

a package-retaining body, said body comprising a base, a top, a front wall, a back wall, and a pair of side walls, said walls defining a package-retaining area, said top being movable from a first rolled up, position to a second, extended and covering position, said body further including a first set of fasteners to maintain said top in said rolled up position and a second set of fasteners to maintain said top in said extended and covering position; and means for attaching said body to the truck bed.

2. The package-retaining accessory of claim 1, wherein the truck bed includes a plurality of wall surfaces, said back wall of said body being adapted to be positioned against one of said wall surfaces.

3. The package-retaining accessory of claim 2 wherein said wall surfaces are defined by a cargo bed liner.

4. The package-retaining accessory of claim 2 wherein said wall surfaces are defined by a cargo area divider.

5. The package-retaining accessory of claim 2 wherein said body further includes a bracket connected to one of said wall surfaces of said truck bed.

6. The package-retaining accessory of claim 5 wherein said body includes top opening, said top opening including top opening former.

7. The package-retaining accessory of claim 6 wherein said bracket is pivotably attached to said one wall surface whereby said bracket may be reversibly moved from a first position supporting said former to a second position wherein said former s not supported.

8. The package-retaining accessory of claim 6 wherein said bracket includes a first arm and a second arm, said arms being interconnected perpendicularly to one another.

9. The package-retaining accessory of claim 8 wherein each of said arms has a former support end, said end defining support-receiving slot.

10. The package-retaining accessory of claim 8 wherein said first arm includes a first face for cooperating with a first wall surface and said second arm includes a second face for cooperating with a second wall surface.

11. The package-retaining accessory of claim 2 wherein said means for attaching comprises an extension line adapted for securing to the truck bed.

12. The package-retaining accessory of claim 1 wherein said body has an interior space defined therein, said accessory further including a liner removably positionable therein.

13. The package-retaining accessory of claim 1 wherein said body has an interior space defined therein, said accessory including a divider wall disposed therein.

14. The invention as defined in claim 1 and in which said attaching means comprises at least one loop attached to said package-retaining body and hooks adapted to be attached to the truck bed.

15. The package-retaining accessory of claim 1 and including dividing means for subdividing said area into two or more sections.

16. The package-retaining accessory as defined in claim 1 and in which said body is formed of a loose woven fabric material.

17. The package-retaining accessory as defined in claim 1 and in which said body is formed of netting.

18. In combination with a cargo restraint system for the bed of a pick up truck a package-retaining accessory, said accessory comprising:

a package retaining body movable between a collapsed closed position and an open position, said body comprising a base, a top, a front wall, a back wall, and a pair of side walls, said walls defining a package-retaining area, said body being formed of a net material, means for attaching said body to the bed of said pick-up truck, and said attaching means including an extension line attached to said front wall, said extension line interconnecting said body and said vehicle to enable said front wall to be pulled away from said back wall to open said package-retaining area.

19. The package-retaining accessory of claim 18 further including dividing means for subdividing said area into two or more sections.

20. The package-retaining accessory of claim 18 further including a clamp removably attached to one of said walls for receiving an end of said extension line.

21. The invention as defined in claim 18 and in which said attaching means comprises at least on loop attached to said package-retaining body and hooks adapted to be attached to the truck bed.

* * * * *